(12) United States Patent
Du et al.

(10) Patent No.: US 7,167,888 B2
(45) Date of Patent: Jan. 23, 2007

(54) SYSTEM AND METHOD FOR ACCURATELY CALCULATING A MATHEMATICAL POWER FUNCTION IN AN ELECTRONIC DEVICE

(75) Inventors: Robert Du, Danville, CA (US); Chinping Q. Yang, Cupertino, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 720 days.

(21) Appl. No.: 10/314,652

(22) Filed: Dec. 9, 2002

(65) Prior Publication Data
US 2004/0111460 A1 Jun. 10, 2004

(51) Int. Cl.
*G06F 7/38* (2006.01)
(52) U.S. Cl. ...................................... 708/606
(58) Field of Classification Search ................. 708/606
See application file for complete search history.

(56) References Cited

U.S. PATENT DOCUMENTS

| | | | |
|---|---|---|---|
| 5,912,830 A * | 6/1999 | Krech et al. ................. | 708/606 |
| 5,926,406 A * | 7/1999 | Tucker et al. ................ | 708/606 |
| 6,463,452 B1 * | 10/2002 | Schulist ....................... | 708/606 |
| 2002/0147753 A1 * | 10/2002 | Rao et al. .................... | 708/606 |
| 2003/0131038 A1 * | 7/2003 | Sato ............................ | 708/606 |

* cited by examiner

*Primary Examiner*—D. H. Malzahn
(74) *Attorney, Agent, or Firm*—Gregory J. Koerner; Redwood Patent Law (57) ABSTRACT

A system and method for accurately calculating a mathematical power function in an electronic device may include an application program that is configured to calculate a direct estimate of power function value for the mathematical power function during a direct linear interpolations procedure. The application program may also calculate an indirect estimate of power function value for a complement power function during an indirect linear interpolation procedure. The application program may then perform a final function-estimate calculation procedure to accurately produce a final estimated power function value from the foregoing direct estimate of power function value and indirect estimate of power function value.

44 Claims, 7 Drawing Sheets

SYSTEM AND METHOD FOR ACCURATELY CALCULATING A MATHEMATICAL POWER FUNCTION IN AN ELECTRONIC DEVICE

BACKGROUND SECTION

1. Field of the Invention

This invention relates generally to techniques for manipulating electronic information, and relates more particularly to a system and method for accurately calculating a mathematical power function in an electronic device.

2. Description of the Background Art

Implementing efficient and accurate methods for manipulating electronic information is a significant consideration for designers and manufacturers of contemporary electronic entertainment systems. However, effectively implementing such systems may create substantial challenges for system designers. For example, enhanced demands for increased system functionality and performance may require more system processing power and require additional hardware resources. An increase in processing or hardware requirements may also result in a corresponding detrimental economic impact due to increased production costs and operational inefficiencies.

Furthermore, enhanced system capability to perform various advanced operations may provide additional benefits to a system user, but may also place increased demands on the control and management of various system components. For example, an enhanced electronic system that effectively supports video and audio applications may benefit from an efficient implementation because of the large amount and complexity of the digital data involved.

Due to growing demands on system resources and substantially increasing data magnitudes, it is apparent that developing new techniques for manipulating electronic information is a matter of concern for related electronic technologies. Therefore, for all the foregoing reasons, developing efficient and accurate systems for manipulating electronic information remains a significant consideration for designers, manufacturers, and users of contemporary electronic systems.

SUMMARY

In accordance with the present invention, a system and method are disclosed for accurately calculating a mathematical power function in an electronic device. In accordance with one embodiment of the present invention, a system designer or other appropriate entity may initially create a partial lookup table for use in accurately calculating the mathematical power function. The partial lookup table is typically created only once, and then may be stored into a local memory or other suitable location for subsequent use. The partial lookup table may include a subset of the result values for a complement power function that has an opposite curvature to that of the mathematical power function.

In addition, the system designer or other appropriate entity may select optimal weighting values for computing a final estimated power function value by utilizing any appropriate techniques. The foregoing optimal weighting values are typically determined initially, and then may be stored into the local memory or other suitable location for subsequent use. The optimal weighting values may be selected to minimize estimation errors when computing the foregoing final estimated power function value.

In certain embodiments, an application program or other appropriate entity may then determine whether a mathematical power function variable x from the mathematical power function f(x) is less than or equal to a total entry value M which represents the total number of table entries in the foregoing partial lookup table. If the mathematical power function variable x is less than or equal to the total entry value M, then the application program or other appropriate entity may simply perform a table lookup procedure to obtain a mathematical power function result value from the partial lookup table.

However, if the mathematical power function variable x is greater than the total entry value M, then the application program or other appropriate entity may compute a value m and a value n for performing a direct linear interpolation procedure to obtain a direct estimate of power function value, and for performing an indirect linear interpolation procedure to obtain an indirect estimate of power function value. The application program or other appropriate entity may next perform a table lookup procedure in the partial lookup table to obtain available common table values for performing the direct linear interpolation procedure and the indirect linear interpolation procedure. The application program or other appropriate entity may then temporarily store the available common table values for subsequent use.

The application program or other appropriate entity may also compute and temporarily store certain common composite terms for performing the direct linear interpolation procedure and the indirect linear interpolation procedure. Then, the application program or other appropriate entity may utilize the previously calculated intermediate values to perform a direct linear interpolation procedure for obtaining a direct estimate of power function value. The application program or other appropriate entity may similarly utilize the previously calculated intermediate values to perform an indirect linear interpolation procedure to obtain an indirect estimate of power function value.

Finally, the application program or other appropriate entity may calculate a final estimated power function value by utilizing the foregoing weighting values combined with the direct estimate of power function value and the indirect estimate of power function value. The present invention therefore provides an improved system and method for accurately calculating a mathematical power function in an electronic device.

DETAILED DESCRIPTION

The present invention relates to an improvement in electronic calculation techniques. The following description is presented to enable one of ordinary skill in the art to make and use the invention, and is provided in the context of a patent application and its requirements. Various modifications to the disclosed embodiments will be readily apparent to those skilled in the art, and the generic principles herein may be applied to other embodiments. Thus, the present invention is not intended to be limited to the embodiments shown, but is to be accorded the widest scope consistent with the principles and features described herein.

The present invention is described herein as a system and method for accurately calculating a mathematical power function in an electronic device, and may include an application program that is configured to calculate a direct estimate of power function value for the mathematical power function during a direct linear interpolations procedure. The application program may also calculate an indirect estimate of power function value for a complement power function during an indirect linear interpolation procedure. In accordance with the present invention, the application program may then perform a final function-estimate calculation procedure to accurately produce a final estimated power function value from the foregoing direct estimate of power function value and indirect estimate of power function value.

Figure 1:
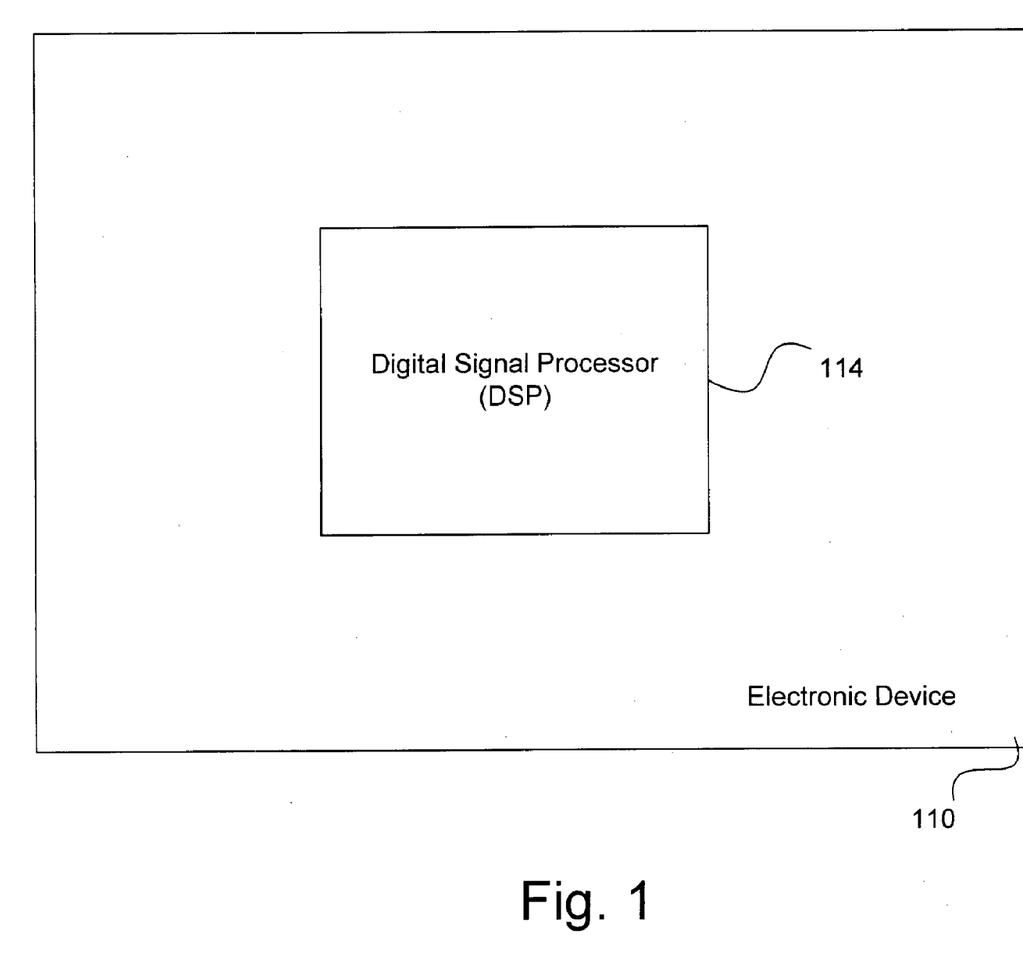
FIG. 1 is a block diagram of an electronic device, in accordance with one embodiment of the present invention.

Referring now to FIG. 1, a block diagram of an electronic device 110 is shown, in accordance with one embodiment of the present invention. In alternate embodiments, electronic device 110 may readily be implemented using various components and configurations in addition to, or instead of, those discussed in conjunction with the FIG. 1 embodiment.

In the FIG. 1 embodiment, electronic device 110 may be implemented as any appropriate electronic device. For example, electronic device may be implemented as an audio-video codec (encoder/decoder) device, a cellular telephone, a computer device, or a consumer electronics device. In the FIG. 1 embodiment, electronic device 110 may include, but is not limited to, a digital signal processor 114. The utilization of the FIG. 1 electronic device 110 is further discussed below in conjunction with FIGS. 2–7.

Figure 2:
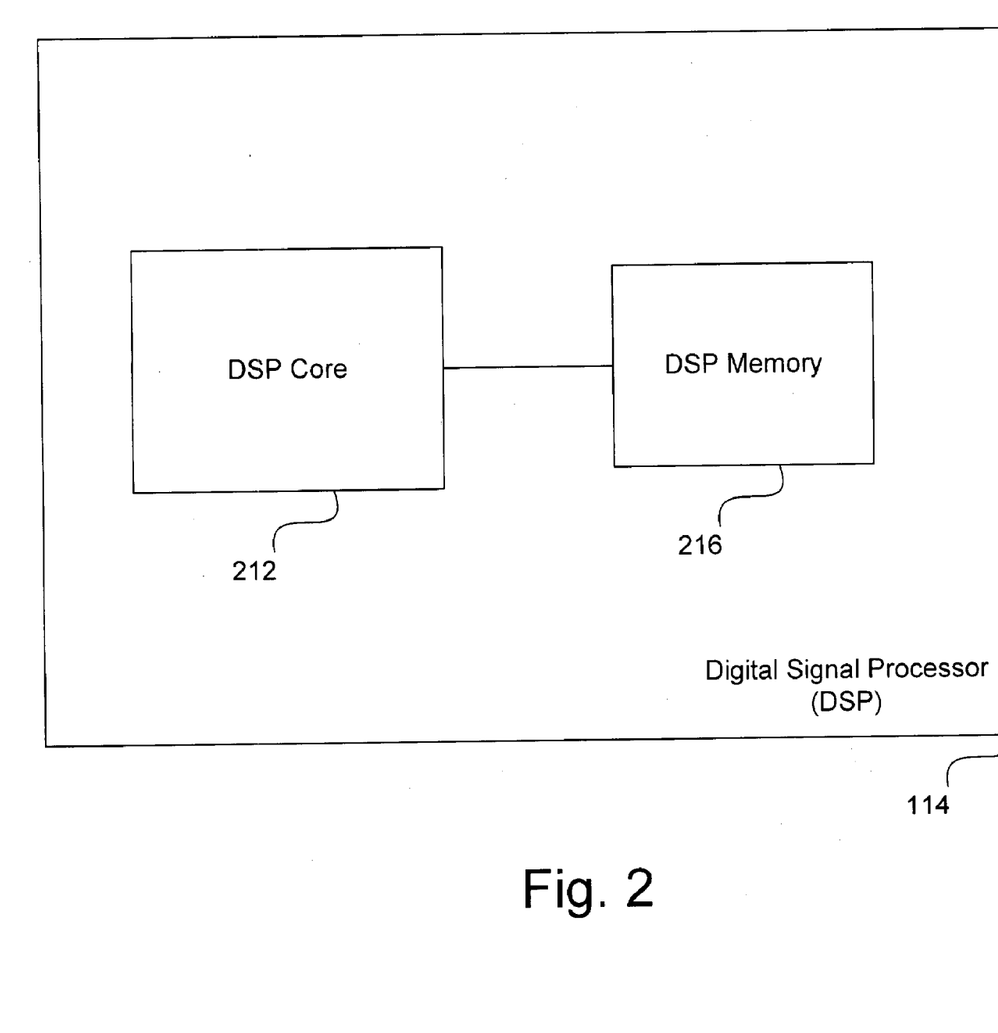
FIG. 2 is a block diagram for the digital signal processor of FIG. 1, in accordance with one embodiment of the present invention.

Referring now to FIG. 2, a block diagram for the FIG. 1 digital signal processor (DSP) 114 is shown, in accordance with one embodiment of the present invention. In the FIG. 2 embodiment, DSP 114 may be implemented as a fixed-point DSP device. However, in alternate embodiments, DSP 114 may readily be implemented using various components and configurations in addition to, or instead of, those discussed in conjunction with the FIG. 2 embodiment. Furthermore, DSP 114 may alternately be implemented as a central-processing unit or microprocessor device in a host computer system.

In the FIG. 2 embodiment, DSP core 212 may be implemented to include any appropriate and compatible DSP core device that preferably executes software instructions to thereby control and manage the operation of DSP 114. In the FIG. 2 embodiment, DSP memory 216 may be implemented to include any combination of desired storage devices, including, but not limited to, read-only memory (ROM) and random-access memory (RAM). The contents and functionality of DSP memory 216 are further discussed below in conjunction with FIG. 3.

Figure 3:
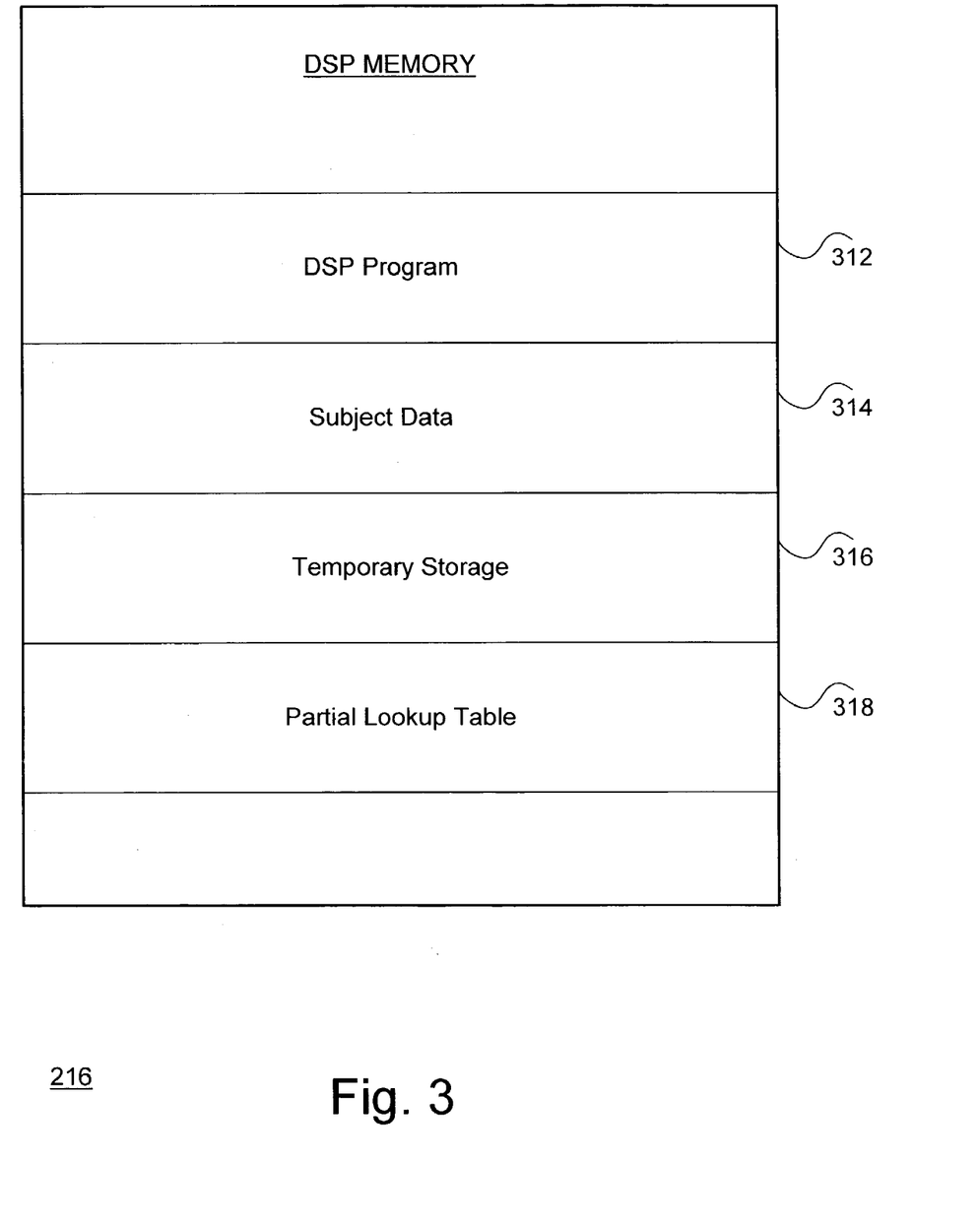
FIG. 3 is a block diagram for the DSP memory of FIG. 2, in accordance with one embodiment of the present invention.

Referring now to FIG. 3, a block diagram for the FIG. 2 DSP memory 216 is shown, in accordance with one embodiment of the present invention. In the FIG. 3 embodiment, DSP memory 216 preferably includes, but is not limited to, a DSP program 312, one or more types of subject data 314, temporary storage 316, and a partial lookup table 318. In alternate embodiments, DSP memory 216 may readily include various other components in addition to, or instead of, those components discussed in conjunction with the FIG. 3 embodiment.

In the FIG. 3 embodiment, DSP program 312 may include program instructions for an application program or any other type of program that is preferably executed by DSP core 212 (FIG. 2) to perform various functions and operations for electronic device 110. The particular nature and functionality of DSP program 312 preferably varies depending upon factors such as the specific type and particular functionality of the corresponding electronic device 110. In the FIG. 3 embodiment, subject data 314 may include any appropriate information or data for use by electronic device 114. For example, subject data 314 may include video information and audio information for processing by electronic device 110.

In the FIG. 3 embodiment, temporary storage 316 may temporarily store any data or values needed by electronic device 110 during various calculation and processing procedures. Partial lookup table 318 may include a partial set of values for one or more mathematical power functions or complement power functions for use by DSP program 213 of electronic device 110. The operation of DSP program is further discussed below in conjunction with FIGS. 4 through 7.

In the FIG. 3 embodiment, the present invention is disclosed and discussed as being implemented primarily as software. However, in alternate embodiments, some or all of the functions of the present invention may be performed by appropriate electronic hardware circuits that are configured for performing various functions that are equivalent to those functions of the software modules discussed herein.

Figure 4:
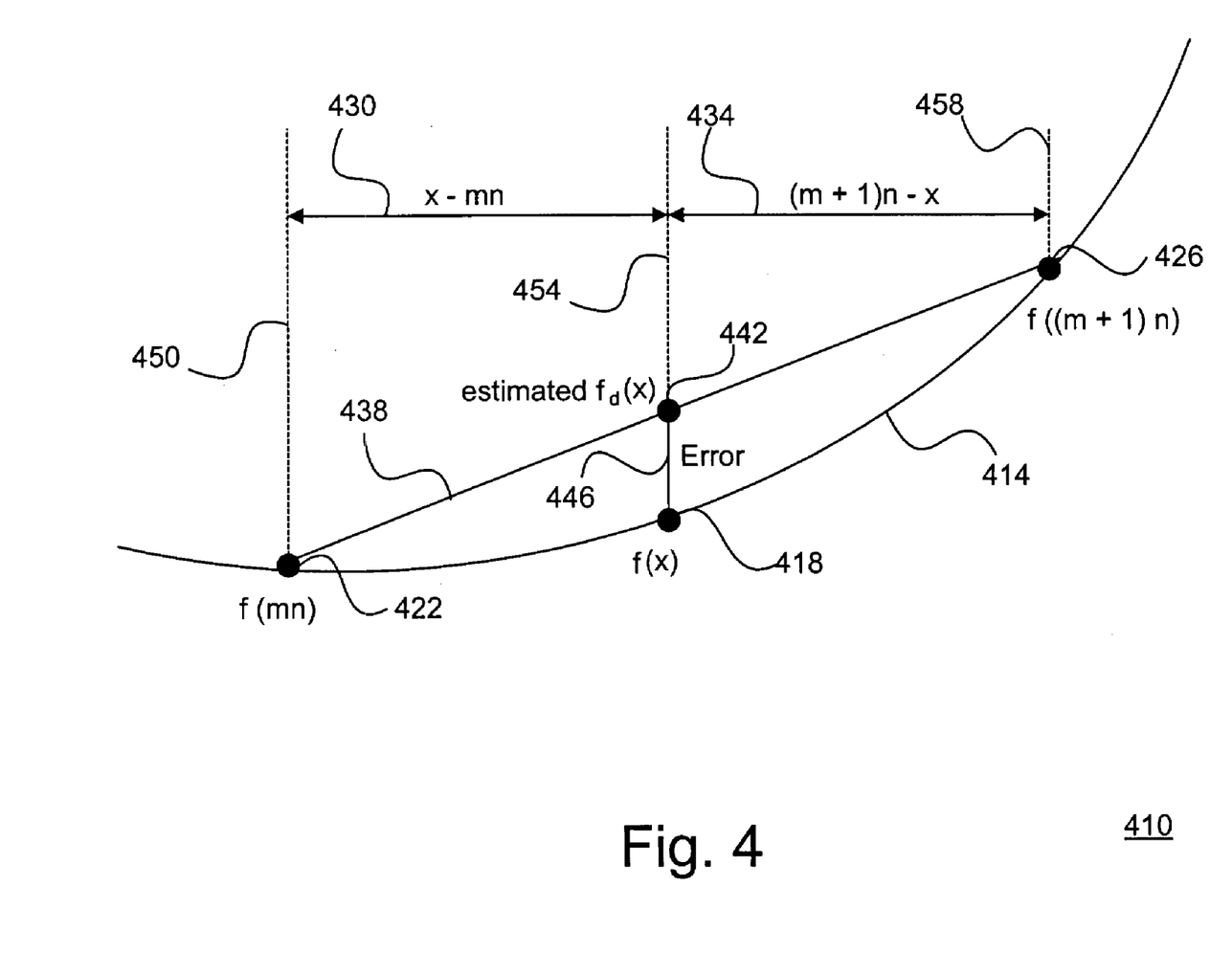
FIG. 4 is a graph illustrating a direct linear interpolation procedure, in accordance with one embodiment of the present invention.

Referring now to FIG. 4, a graph 410 illustrating a direct linear interpolation procedure is shown, in accordance with one embodiment of the present invention. In the FIG. 4 embodiment, graph 410 is presented as an example to illustrate certain principles of the present invention. However, in alternate embodiments, the present invention may readily perform direct linear interpolation procedures using various techniques and other graphable relationships in addition to, or instead of, those discussed in conjunction with the FIG. 4 embodiment.

In certain embodiments, the present invention includes a system and method for computing a mathematical power function $f(x)=x^a$ using a fixed-point digital signal processor (DSP). The aforementioned power function is essential in many signal-processing applications such as digital audio compression algorithms MP3 (MPEG I or II, layer3), and AAC (MPEG Advanced Audio Coding). In MP3 and AAC decoders, x is a positive integer variable and the exponent a is a fractional constant (a=4/3).

In a broader scope of data compression, the power function in general may be used to map between uniform PCM and non-uniform PCM for the purpose of bit reduction. This technique is also called companding (compressing and expanding). A fixed-point DSP is a type of processor that has no floating-point units available, and all numbers are represented by N digit integers, where N can be 16, 24, 32 or 64, etc. The fixed-point DSPs are widely used in various consumer products such as cellular telephones and DVD players because of their low cost and reduced power consumption.

One solution for computing a power function is to utilize an extensive full lookup table that has all pre-calculated function values for all possible values x. Therefore the size of the lookup table is solely determined by the number of possible values x can take. The full-table lookup method may be appropriate if the range of x is small. But in reality, x can frequently take a fairly large range. For example, in MP3 and AAC codecs, x may be as large as 8191. If each table entry is represented using a floating-point representation consisting of mantissa and exponent parts, the full-table lookup method would require 16 kwords of memory to store the table.

An alternative solution is to use brute force calculation by calling a mathematical function. Both methods may be acceptable in some scenarios where memory resources are not a constraint factor, and where CPU resources and sufficient CPU processing speeds are available. Unfortunately, neither method is acceptable in cost-sensitive consumer products such as digital audio players, DVDs, cellular telephones, and Digital TVs, since large memory usage implies large chip size and higher fabrication costs, and since CPU resources are rarely abundant with various components competing for the CPU.

The present invention proposes a method which utilizes the combination of a partial table lookup 318 (FIG. 3) and a dual linear interpolation method. Basically, the proposed method may use a simple table lookup for $x \leq M$, with $M << max(x)$, where M is the number of entries in the partial lookup table 318 and the mathematical symbol a<<b means variable a is much smaller than variable b. For cases where x>M, a dual linear interpolation method may then be used to estimate the power function.

A fundamental technique of the present invention is to find two integer points, $m,n \leq M$ such that $m*n \leq x \leq (m+1)n$, Since f(x) is a monotonic function, graph 410 illustrates that $$f(mn) \leq f(x) \leq f[(m+1)n].$$

A linear interpolation of an f(x) along an interpolation line may thus be given according to the following Equation (1):

$$\hat{f}(x) = \frac{1}{n}[(m+1)n - x]f(mn) + (x - mn)f[(m+1)n] \quad (1)$$

Since the power function has the property $f(xy)=f(x)f(y)$, then Equation (1) may be rewritten as the following Equation (2):

$$\hat{f}(x) = \frac{1}{n}f(n)[((m+1)n - x)f(m) + (x - mn)f(m+1)] \quad (2)$$

By substituting the power function definition into Equation (2), the following Equation (3) may be obtained:

$$\hat{x}^a = \frac{n^a}{n}[((m+1)n - x)m^a + (x - mn)(m+1)^a], \quad (3)$$

where $m^a$, $(m+1)^a$ and $n^a$ are table lookup results from the partial lookup table 318 (FIG. 3). In the AAC and MP3 cases, the size of partial lookup table 318 may only require approximately 1 kwords in contrast to approximately 16 kwords required for a corresponding full table lookup.

In the FIG. 4 embodiment, graph 410 shows an exemplary original power function curve 414 which includes a power function value to estimate f(x) 418 selected to illustrate one embodiment of the direct linear interpolation procedure. Graph 410 also includes a first interpolation endpoint value f(mn) 422 and a second interpolation endpoint value f((n+1)n) 426 between which a linear interpolation line 438 may be drawn.

Then, a direct estimate of power function value $\hat{f}_d(x)$ 442 may be obtained by locating estimated power function value $\hat{f}_d(x)$ 442 at an intersecting point between interpolation line 438 and an axis line 454 that passes through the selected power function value f(x) 418 on power function curve 414 in the manner shown in graph 410. Graph 410 also shows an error offset value 446 that represents the estimation error between the actual power function value f(x) 418 and the directly estimated power function $\hat{f}_d(x)$ 442.

As can be seen in graph 410 of FIG. 4, the curvature of the exemplary power function curve 414 for power function $f(x)=x^{4/3}$ makes the estimated power function value 422 biased, which in turn results in large positive estimation errors. One technique for compensating for the foregoing estimations errors is further discussed below in conjunction with FIGS. 5–7.

Figure 5:
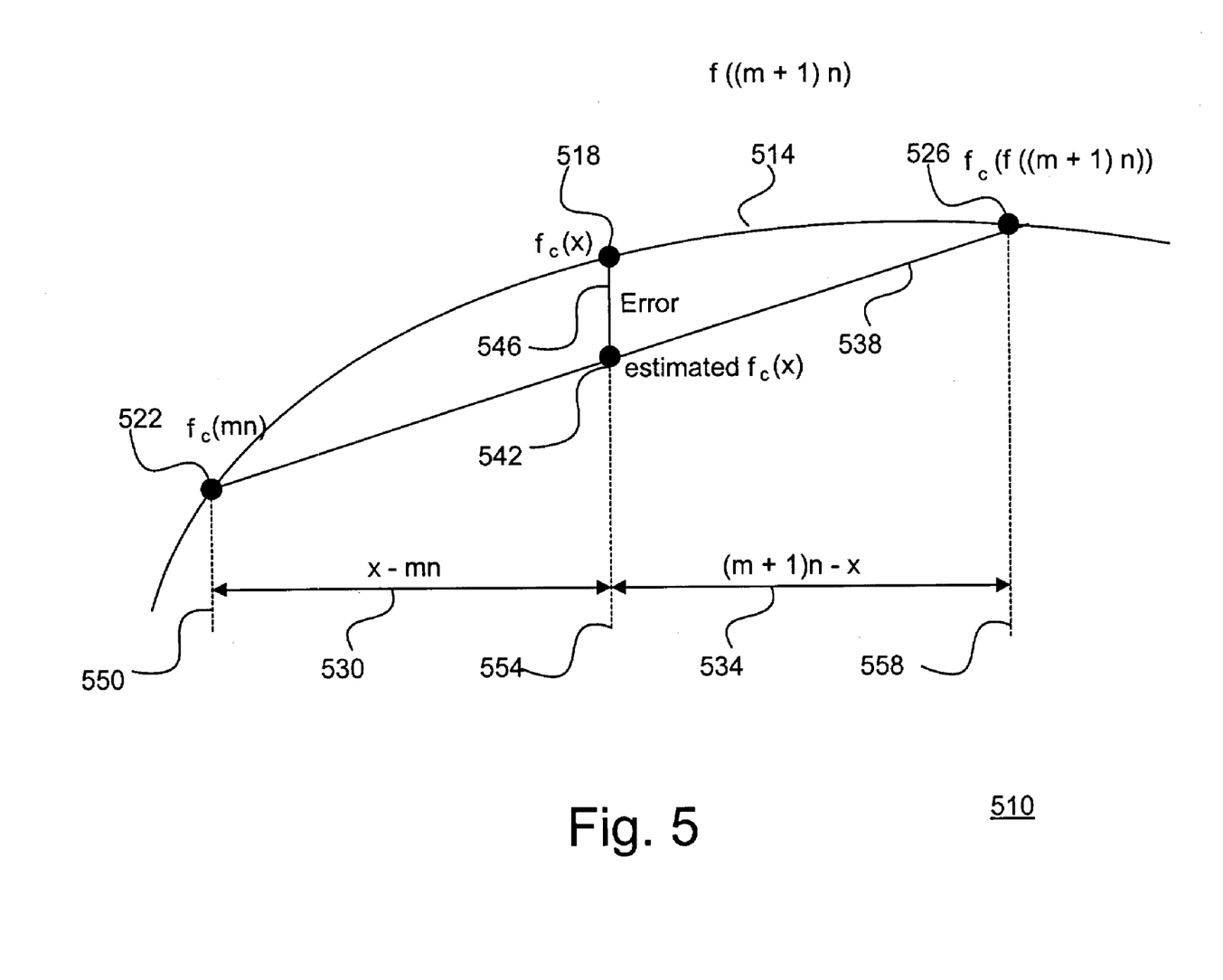
FIG. 5 is graph illustrating an indirect linear interpolation procedure, in accordance with one embodiment of the present invention.

Referring now to FIG. 5, a graph 510 illustrating an indirect linear interpolation procedure is shown, in accordance with one embodiment of the present invention. The indirect linear interpolation procedure includes two separate steps. In the first step, the estimation of the complement power function $\hat{f}_c(x)$ is obtained by linear interpolation. The second step is to compute the indirect estimate of the original power function using the relationship $\hat{f}_i(x)=x\hat{f}_c(x)$.

The purpose of the FIG. 5 is mainly to illustrate a way to estimate the complement power function $f_c(x)$ using a linear interpolation approach. In the FIG. 5 embodiment, graph 510 is presented herein as an example to illustrate certain principles of the present invention. However, in alternate embodiments, the present invention may readily perform indirect linear interpolation procedures using various techniques, and other graphable relationships in addition to, or instead of, those discussed in conjunction with the FIG. 5 embodiment.

In accordance with the present invention, as shown in graph 510 of the FIG. 5 example, DSP 312 (FIG. 3) or another appropriate entity may advantageously find a complement power function $f_c(x)$ with a corresponding complement power function curve 514 that has an opposite, mirror-image curvature with respect to the foregoing original power function curve 414 of FIG. 4. The complement power function may be obtained in any effective manner. Then the foregoing direct estimate of power function value 442 may be derived from the original power function f(x), and an indirect estimate of power function value 642 may similarly be derived from the complement power function $f_c(x)$.

The direct estimate of power function value 442 may be referred to herein as $\hat{f}_d(x)$, and the indirect estimate of power function value may be referred to herein as $\hat{f}_i(x)$. In accordance with the present invention, as discussed below in conjunction with FIG. 6, a final estimated power function value may then be calculated to be a weighted average of the foregoing directly estimated power function value 442 and the indirectly estimated power function value 642.

In the FIG. 5 embodiment, graph 510 shows an exemplary complement power function curve 514 for a complement power function $f_c(x)$.

Complement power function curve 514 includes a complement power function value $f_c(x)$ 518 selected to illustrate one embodiment of the indirect linear interpolation procedure. Graph 510 also includes a first complement interpolation endpoint value $f_c(mn)$ 522 and a second complement interpolation endpoint value $f_c((m+1)n)$ 526 between which a complement interpolation line 538 may be drawn.

Then, an estimated complement power function value $\hat{f}_c(x)$ 542 may be obtained by locating estimated complement power function value $\hat{f}_c(x)$ 542 at an intersecting point between complement interpolation line 538 and an axis line 554 that passes through the selected complement power function value $f_c(x)$ 518 on complement power function curve 514 in the manner shown in graph 510. Graph 510 also shows an error offset value 546 that represents the estimation error between the actual complement power function value $f_c(x)$ 518 and the estimated complement power function $\hat{f}_c(x)$ 542

In certain embodiments, DSP program 312 (FIG. 3) or another appropriate entity may perform the indirect interpolation procedure in an AAC/MP3 environment in which the mathematical power function to estimate may be expressed as $f(x)=x^{4/3}$. In certain embodiments, the corresponding complement power function may be expressed as $f_c(x)=x^{1/3}$.

Therefore, indirectly estimated power function values $\hat{f}_i(x)$ 642 may be obtained from corresponding estimated complement power function values $\hat{f}_c(x)$ 542 in accordance with the following Equation (4).

$$\hat{f}_i(x) = x\hat{f}_c(x) \quad (4)$$

In accordance with the present invention, since $f(x)$ and $f_c(x)$ have opposite curvatures, the corresponding linear-interpolation estimation errors 446 and 546 may advantageously cancel each other if the two estimates are combined. To prove the assertion of opposite curvatures, it suffices to calculate the second order derivative of the two functions $$\frac{d^2 f(x)}{dx^2} = \frac{4}{9}x^{-2/3} > 0 \text{ for } x > 0$$

$$\frac{d^2 f_c(x)}{dx^2} = -\frac{2}{9}x^{-5/3} < 0 \text{ for } x > 0$$

Since the second-order derivatives of the two functions always have opposite signs, therefore the curvatures are opposite.

Furthermore, only an indirect partial lookup table 318 for the complement indirect power function $f_c(x)=x^{1/3}$ need be saved. A corresponding direct partial table for direct power function $f(x)$ may be derived from the table of $f_c(x)$ using the relationship of $f(x)=xf_c(x)$.

The direct estimate of power function values 442 may then be calculated in accordance with Equation (5) as follows:

$$\hat{f}_d(x) = n^{1/3}[(m+1)(x-mn)(m+1)^{1/3} + m((m+1)n-x)m^{1/3}] \quad (5)$$

where $n^{1/3}$, $m^{1/3}$ and $(m+1)^{1/3}$ are table lookup results.

Figure 6:
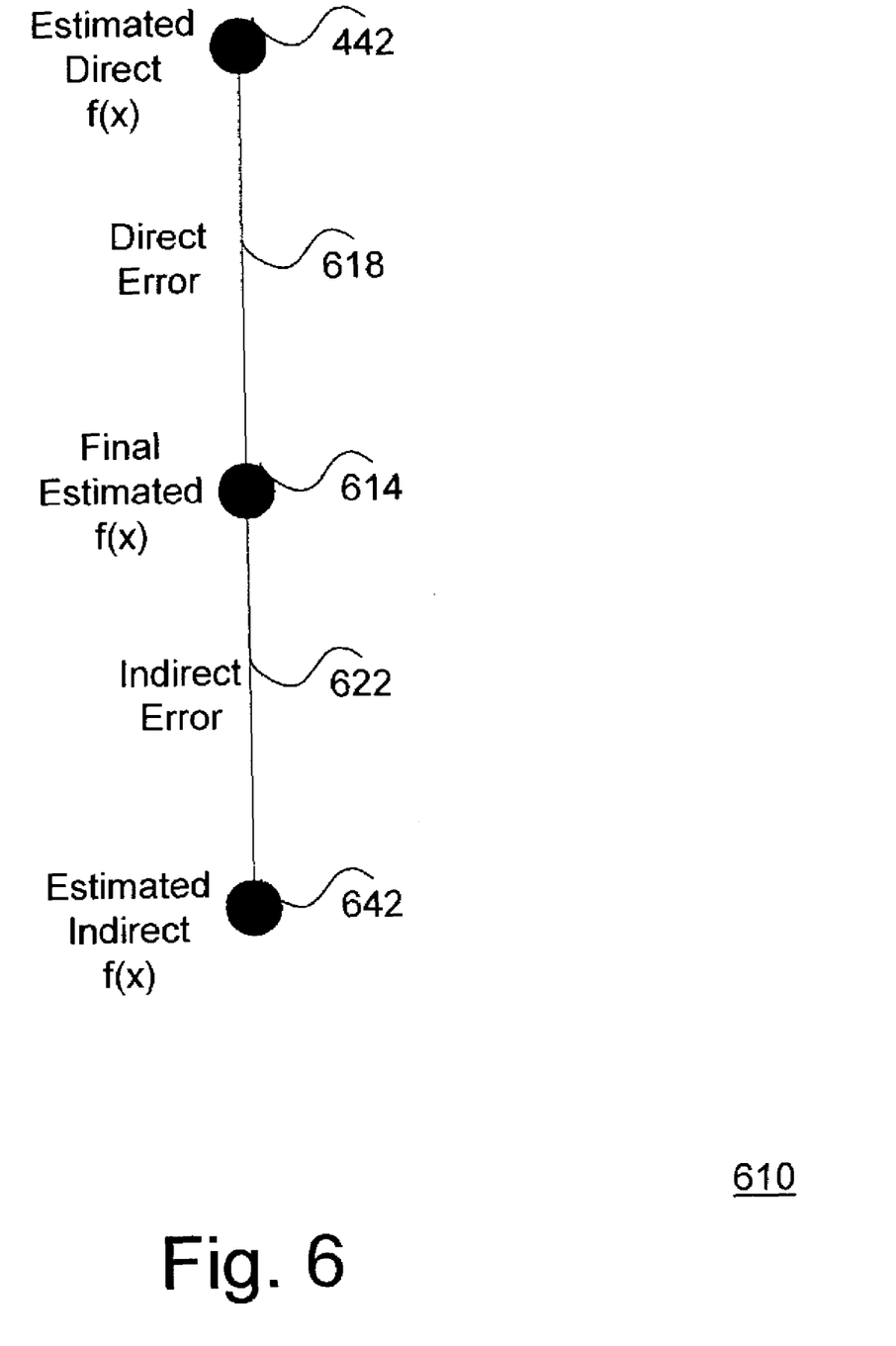
FIG. 6 is a diagram illustrating a final function-estimate calculation procedure, in accordance with one embodiment of the present invention.

Similarly, the indirect estimate of power function values 642 may then be calculated in accordance with Equation (6) as follows:

$$\hat{f}_i(x) = x\frac{n^{1/3}}{n}[(x-mn)(m+1)^{1/3} + ((m+1)n-x)m^{1/3}] \quad (6)$$

where $n^{1/3}$, $m^{1/3}$ and $(m+1)^{1/3}$ are table lookup results

Referring now to FIG. 6, a diagram 610 illustrating a final function-estimate calculation procedure is shown, in accordance with one embodiment of the present invention. In the FIG. 6 embodiment, diagram 610 is presented herein as an example to illustrate certain principles of the present invention. However, in alternate embodiments, the present invention may readily perform final function-estimate calculation procedures using various techniques, and other relationships in addition to, or instead of, those discussed in conjunction with the FIG. 6 embodiment.

In the FIG. 6 embodiment, a final estimated power function value $\hat{f}(x)$ 614 is shown. Also shown are a direct estimate of power function value $\hat{f}_d(x)$ 442 (see FIG. 4) separated from final estimated power function value $\hat{f}(x)$ 614 by a direct estimation error value 618 and an indirect estimate of power function value $\hat{f}_i(x)$ 642 separated from final estimated power function value $\hat{f}(x)$ 614 by an indirect estimation error value 622.

In accordance with certain embodiments of the present invention, DSP program 312 or another appropriate entity may calculate final estimated power function value $\hat{f}(x)$ 614 to be a weighted average of directly estimated power function value $\hat{f}_d(x)$ 442 and indirectly estimated power function value $\hat{f}_i(x)$ 642 in accordance with an Equation (7):

$$\hat{f}(x) = w_1\hat{f}_d(x) + w_2\hat{f}_i(x) \quad (7)$$

In the FIG. 6 embodiment, a direct weighting value $w_1$ and an indirect weighting value $w_2$ may be chosen so that an overall estimation error for calculating mathematical power functions is minimized. In the FIG. 6 embodiment, $w_1=1/3$ and $w_2=2/3$.

With reference to foregoing Equations (5) and (6), the two estimate Equations share many common terms, which include three table lookup terms $n^{1/3}, m^{1/3}, (m+1)^{1/3}$ from partial lookup table 318, and two composite common terms $(x-mn)(m+1)^{1/3}$ and $((m+1)n-x)m^{1/3}$. In accordance with the present invention, such common intermediate values should be computed only once and then saved into temporary storage 316 or other suitable location for future use.

In practice, with reference to the foregoing exemplary AAC/MP3 environments, initially, a partial lookup table 318 may be created for complement power function $f_c(x)=x^{1/3}$. The partial lookup table 318 may be defined to contain M entries. For example, in certain embodiments, M may be 128, 256 or 512.

Then, an optimal weight vector $w=[w_1,w_2]^T$ may be calculated to optimally minimize estimation errors by utilizing any effective means. For example, the present invention may utilize a p-norm of the error function and the foregoing weight vector that is a solution which minimizes the error function as shown in Equation (8):

$$\arg_w \min e(w) = \arg_w \min \|\hat{f}(x)-f(x)\|_p \quad (8)$$

Next, the value x of the mathematical power function $f(x)$ may be tested by determining whether, for a given x, $1 \leq x \leq 8191$, test $x \leq M$. In accordance with the present invention, if the foregoing test is TRUE, then DSP program 312 or other appropriate entity may simply do a table lookup $f(x)=T(x)$ from partial lookup table 318, and may then stop.

However, if the foregoing test is FALSE, then DSP program 312 or other appropriate entity may compute an n value for the direct and indirect estimation calculations by using the following equation, with the ceiling function rounding the variable up to the next positive integer:

$$n = 2^{ceil(log2(x/M))}.$$

In certain embodiments, the number M may be chosen as an integer power of 2. So x/M may be obtained by simple arithmetical right-shifting x by $log_2$ M, which is a predetermined constant.

Similarly, DSP program 312 or other appropriate entity may compute an m value for the direct and indirect estimation calculations by using the following equation:

$$m = floor(x/n).$$

The foregoing floor function rounds the variable down to the nearest integer. Since n is an integer power of 2, x/n may be obtained by simple arithmetical right-shifting x by $ceil(log_2(x/M))$, which has already been computed in the previous step.

Next, DSP program 312 or other appropriate entity may perform a table lookup from partial lookup table 318 to get $n^{1/3} = T(n)$, $m^{1/3} = T(m)$, $(m+1)^{1/3} = T(m+1)$. DSP program 312 or other appropriate entity may then compute the two composite terms $(x-mn)(m+1)^{1/3}$ and $((m+1)n-x)m^{1/3}$, and save the results.

DSP program 312 or other appropriate entity may next compute the direct and indirect estimates of the power functions according to foregoing Equations (5) and (6) by efficiently utilizing the intermediate results from the previous two steps. Again, the division in the equations may be replaced by arithmetic right-shift operations. Finally, DSP program 312 or other appropriate entity may calculate the final estimate of the mathematical power function by utilizing foregoing Equation (7).

When the present invention is practiced in the MP3 and AAC environments, it can advantageously reduce the estimation error by more than 5000 times as compared to the direct linear interpolation only approach, assuming that the same lookup table size is used. Even if the table size is reduced from an original 1 k words to ¼ k words, the estimation error can still be reduced by a factor of 100 with the present invention. Thus the invention achieves significant performance improvement while reducing the memory usage. The dramatic performance improvement is achieved at the cost of a very slight increase in CPU cycles. The present invention is described herein in the context of calculating a mathematical power function, however, in various embodiments, principles and techniques from the present invention may be applied when calculating various other mathematical functions.

Figure 7:
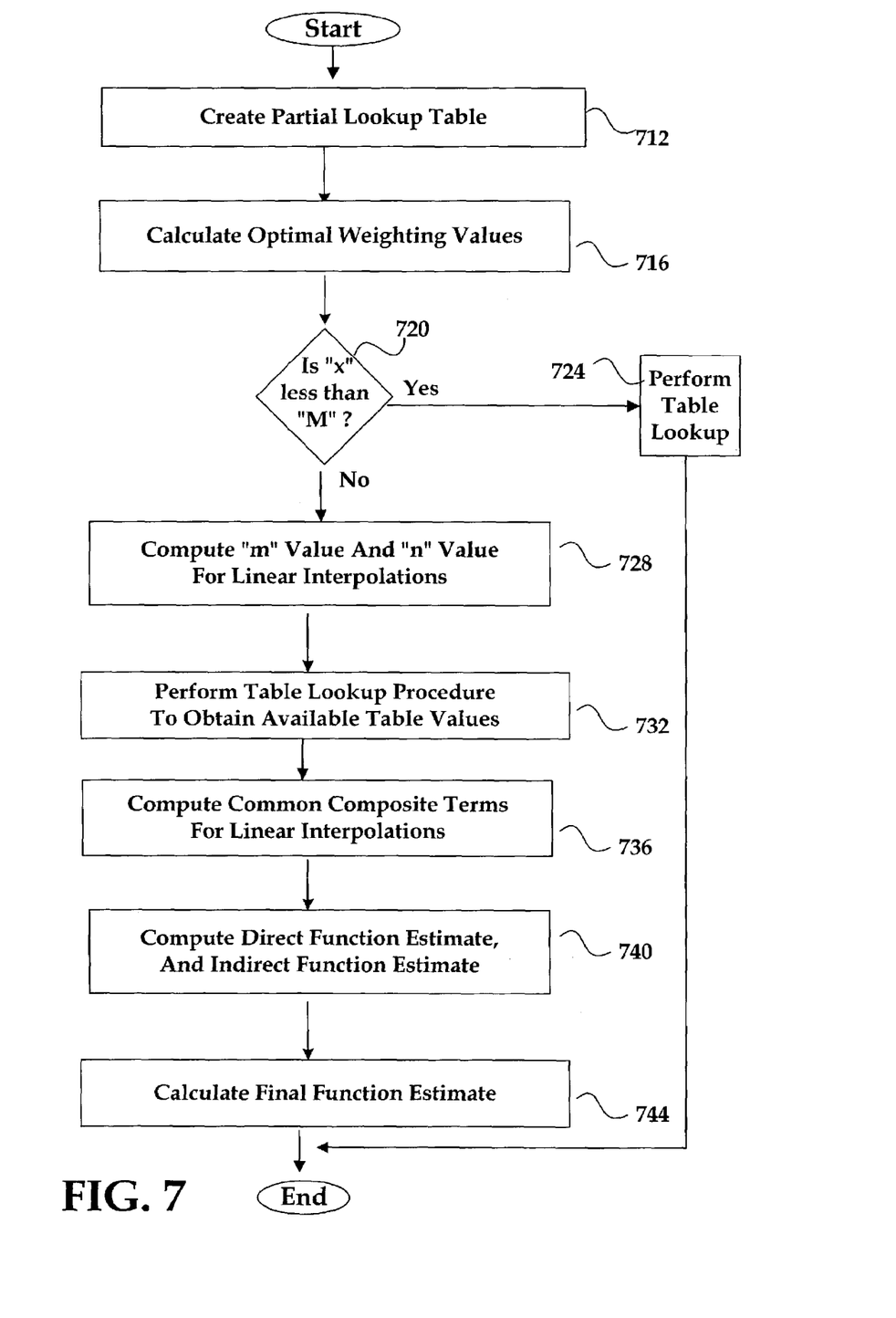
FIG. 7 is a flowchart of method steps for accurately calculating a mathematical power function, in accordance with one embodiment of the present invention.

Referring now to FIG. 7, a flowchart of method steps for accurately calculating a mathematical power function is shown, in accordance with one embodiment of the present invention. The FIG. 7 example is presented for purposes of illustration, and in alternate embodiments, the present invention may readily utilize various steps and sequences other than those discussed in conjunction with the FIG. 7 embodiment.

In the FIG. 7 embodiment, in step 712, a partial lookup table 318 for accurately calculating a mathematical power function may initially be created by utilizing any effective means. Partial lookup table 318 is typically created only once, and then may be stored into DSP memory 216 or other suitable location for subsequent use. In the FIG. 7 embodiment, partial lookup table 318 may include a reduced subset of the result values for the mathematical power function or for a complement power function.

In step 716, optimal weighting values for computing a final estimated power function 614 may be determined by utilizing any appropriate techniques. The foregoing optimal weighting values are typically determined initially, and then may be stored into DSP memory 216 or other suitable location for subsequent use. In the FIG. 7 embodiment, the optimal weighting values may be selected to minimize estimation errors when computing a final estimated power function value.

In step 720, a DSP program 312 or other appropriate entity may determine whether a value x of the power function f(x) is less than or equal to a value M which represents the total number of table entries in the foregoing partial lookup table 318. In step 724, if the value x is less than or equal to the value M, then the DSP program 312 or other appropriate entity may simply perform a table lookup procedure to obtain a mathematical power function result value from partial lookup table 318.

However, in step 724, if the value x is greater than the value M, then in step 728, the DSP program 312 or other appropriate entity may compute a value m and a value n for performing a direct linear interpolation procedure to obtain a direct estimate of power function value 442, and for performing an indirect linear interpolation procedure to obtain an indirect estimate of power function value 642. In step 732, DSP program 312 or other appropriate entity may perform a table lookup procedure in partial lookup table 318 to obtain available common table values for performing the direct linear interpolation procedure and the indirect linear interpolation procedure. DSP program 312 or other appropriate entity may then temporarily store the available common table values for subsequent use.

Next, in step 736, DSP program 312 or other appropriate entity may compute and temporarily store certain common composite terms for performing the direct linear interpolation procedure and the indirect linear interpolation procedure. Then in step 740, DSP program 312 or other appropriate entity may utilize the previously calculated intermediate values to perform a direct linear interpolation procedure for obtaining a direct estimate of power function value 442 (direct function estimate).

Also in step 740, DSP program 312 or other appropriate entity may utilize the previously calculated intermediate values to perform an indirect linear interpolation procedure to obtain an indirect estimate of power function value 642 (indirect function estimate). Finally, in step 744, DSP program 312 or other appropriate entity may calculate a final estimated power function value 614 by utilizing the foregoing weighting values combined with direct estimate of power function value 442 and indirect estimate of power function value 642. The FIG. 7 process may then terminate. The present invention thus provides an improved system and method for accurately calculating a mathematical power function in an electronic device.

The invention has been explained above with reference to certain embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A system for accurately calculating a mathematical power function for performing one or more signal-processing tasks in an electronic device, comprising:
   an application program configured to calculate a direct estimate of power function value for said mathematical power function during a direct linear interpolation procedure, said application program also calculating an indirect estimate of power function value for a complement power function during an indirect linear interpolation procedure, said application program then performing a final function-estimate calculation procedure to produce a final estimated power function value from said direct estimate of power function value and said indirect estimate of power function value; and
   a processor device configured to control said application program for accurately calculating said mathematical power function, said mathematical power function being utilized to perform signal processing applications in at least one of an MPEG Advanced Audio Coding environment and an MPEG I/II, layer 3 environment.

2. The system of claim 1 wherein said processor device is implemented to include a fixed-point digital signal processor device.

3. The system of claim 1 wherein said application program utilizes a combination of a partial table lookup and a dual linear interpolation technique, said application program utilizing said partial lookup table for function values of x, in which $x \leq M$, with $M << \max(x)$, where M is a total number of entries in said partial lookup table, said application program alternately utilizing said dual linear interpolation technique to estimate said mathematical power function whenever $x > M$.

4. The system of claim 3 wherein a system designer creates said partial lookup table to include said M as a substantially-reduced subset of all possible values for said mathematical power function to thereby conserve memory resources, said partial lookup table being stored in a local memory device for subsequent uses by said application program.

5. The system of claim 1 wherein a relationship between said mathematical power function $f(x)$ and said complement power function $f_c(x)$ may be expressed in accordance with an equation:

$$f(x) = x f_c(x)$$

said mathematical power function and said complement power function having opposite curvatures, said final function-estimate calculation procedure canceling out opposing linear estimate errors to accurately produce said final estimated power function value.

6. The system of claim 1 wherein a system designer determines weighting values for weighting said direct estimate of power function value and said indirect estimate of power function value during said final function-estimate calculation procedure, said weighting values being calculated to optimally minimize estimation errors in said final estimated power function value.

7. The system of claim 6 wherein an optimal weight vector $w = [w_1, w_2]^T$ for said weighting values is calculated using a p-norm of an error function to minimize said error function according to an equation:

$$\arg_w \min e(w) = \arg_w \min \|f(x) - \hat{f}(x)\|_p$$

said weighting values being then stored in a local memory device for subsequent uses by said application program.

8. The system of claim 1 wherein said application program determines whether a mathematical power function variable x is less than or equal to a total entry value M of a partial lookup table, said application program performing a lookup procedure to obtain said mathematical power function value x whenever said x is less than or equal to said total entry value M.

9. The system of claim 1 wherein said application program determines whether a mathematical power function variable x is less than or equal to a total entry value M of a partial lookup table, said application program computing a value m and a value n corresponding to said mathematical power function value x whenever said x is greater than said total entry value M.

10. The system of claim 9 wherein said value m and said value n are integer points, $m, n \leq M$ such that $m*n \leq x \leq (m+1)n$, so that a function value to estimate $f(x)$ lies between values derived from table lookup results at points of said value m and said value n on a corresponding power function curve according to a formula $f(mn) \leq f(x) \leq f[(m+1)n]$.

11. The system of claim 9 wherein said application program computes said value n according to a formula:

$$n = 2^{\operatorname{ceil}(\log_2(x/M))}$$

in which a ceiling function ceil rounds a formula variable up to a next positive integer, said M being chosen as an integer power of 2 so that $x/M$ may be obtained by a simple arithmetical right-shifting x by $\log_2 M$, which is a predetermined constant.

12. The system of claim 9 wherein said application program computes said value m according to a formula:

$$m = \operatorname{floor}(x/n)$$

in which a floor function floor rounds a formula variable down to a nearest integer, said value n being an integer power of 2, said $x/n$ being obtained by a simple arithmetical right-shifting of said x by a value $\operatorname{ceil}(\log_2(x/M))$ which was previously computed.

13. The system of claim 9 wherein said application program performs a table lookup procedure from said partial lookup table to obtain available common equation terms for calculating said direct estimate of power function value and said indirect estimate of power function value.

14. The system of claim 13 wherein said available common equation terms include a table value T(n), a table value T(m), and a table value T(m+1), said available common equation terms being $n^{1/3} = T(n)$, $m^{1/3} = T(m)$, $(m+1)^{1/3} = T(m+1)$.

15. The system of claim 9 wherein said application program calculates common composite terms for calculating said direct estimate of power function value and said indirect estimate of power function value.

16. The system of claim 15 wherein said common composite terms include $(x-mn)(m+1)^{1/3}$ and $((m+1)n-x)m^{1/3}$, said application program saving said common composite terms in a local memory device for subsequent uses by said application program.

17. The system of claim 9 wherein said application program computes said direct estimate of power function value according to a formula:

$$f_d(x) = n^{1/3}[(m+1)(x-mn)(m+1)^{1/3} + m((m+1)n-x)m^{1/3}].$$

18. The system of claim 17 wherein said application program computes said indirect estimate of power function value according to a formula:

$$\hat{f}_i(x) = x\frac{n^{1/3}}{n}[(x-mn)(m+1)^{1/3} + ((m+1)n-x)m^{1/3}].$$

19. The system of claim 18 wherein said application program calculates said final estimated power function value f̂(x) according to a formula:

$$f(x)=w_1 f_d(x)+w_2 f_i(x)$$

in which said $\hat{f}_d(x)$ is said direct estimate of power function value, said $\hat{f}_i(x)$ is said indirect estimate of power function value, said $w_1$ is a selectable direct weighting value, and said $w_2$ is a selectable indirect weighting value.

20. A system for accurately calculating a mathematical power function for performing one or more signal-processing tasks in an electronic device, comprising:
  an application program configured to calculate a direct estimate of power function value for said mathematical power function during a direct linear interpolation procedure, said application program also calculating an indirect estimate of power function value for a complement power function during an indirect linear interpolation procedure, said application program then performing a final function-estimate calculation procedure to produce a final estimated power function value from said direct estimate of power function value and said indirect estimate of power function value; and
  a processor device configured to control said application program for accurately calculating said mathematical power function, said mathematical power function being implemented to perform signal processing applications in at least one of an MPEG Advanced Audio Coding environment and an MPEG I/II, layer 3 environment, said mathematical power function being f(x)=$x^{4/3}$, and said complement power function being $f_c(x)$=$x^{1/3}$.

21. A method for accurately calculating a mathematical power function for performing one or more signal-processing tasks in an electronic device, comprising:
  utilizing an application program to calculate a direct estimate of power function value for said mathematical power function during a direct linear interpolation procedure, said application program also calculating an indirect estimate of power function value for a complement power function during an indirect linear interpolation procedure, said application program then performing a final function-estimate calculation procedure to produce a final estimated power function value from said direct estimate of power function value and said indirect estimate of power function value; and
  controlling said application program with a processor device to thereby accurately calculate said mathematical power function, said mathematical power function being utilized to perform signal processing applications in at least one of an MPEG Advanced Audio Coding environment and an MPEG I/II, layer 3 environment.

22. The method of claim 21 wherein said processor device is implemented to include a fixed-point digital signal processor device.

23. The method of claim 21 wherein said application program utilizes a combination of a partial table lookup and a dual linear interpolation technique, said application program utilizing said partial lookup table for function values of x, in which x≦M, with M<<max(x), where M is a total number of entries in said partial lookup table, said application program alternately utilizing said dual linear interpolation technique to estimate said mathematical power function whenever x>M.

24. The method of claim 23 wherein a system designer creates said partial lookup table to include said M as a substantially-reduced subset of all possible values for said mathematical power function to thereby conserve memory resources, said partial lookup table being stored in a local memory device for subsequent uses by said application program.

25. The method of claim 21 wherein a relationship between said mathematical power function f(x) and said complement power function $f_c(x)$ may be expressed in accordance with an equation:

$$f(x)=xf_c(x)$$

said mathematical power function and said complement power function having opposite curvatures, said final function-estimate calculation procedure canceling out opposing linear estimate errors to accurately produce said final estimated power function value.

26. The method of claim 21 wherein a system designer determines weighting values for weighting said direct estimate of power function value and said indirect estimate of power function value during said final function-estimate calculation procedure, said weighting values being calculated to optimally minimize estimation errors in said final estimated power function value.

27. The method of claim 26 wherein an optimal weight vector w=[$w_1$, $w_2$]$^T$ for said weighting values is calculated using a p-norm of an error function to minimize said error function according to an equation:

$$\arg_w \min e(w) = \arg_w \min \|\hat{f}(x)-f(x)\|_p$$

said weighting values being then stored in a local memory device for subsequent uses by said application program.

28. The method of claim 21 wherein said application program determines whether a mathematical power function variable x is less than or equal to a total entry value M of a partial lookup table, said application program performing a lookup procedure to obtain said mathematical power function value f(x)=T(x) whenever said x is less than or equal to said total entry value M.

29. The method of claim 21 wherein said application program determines whether a mathematical power function variable x is less than or equal to a total entry value M of a partial lookup table, said application program computing a value m and a value n corresponding to said mathematical power function variable x whenever said x is greater than to said total entry value M.

30. The method of claim 29 wherein said value m and said value n are integer points, m,n≦M such that m*n≦x≦(m+1)n, so that said f(x) lies between values derived from table lookup results from said value m and said value n on a corresponding power function curve according to a formula $$f(mn) \leq f(x) \leq f[(m+1)n].$$

31. The method of claim 29 wherein said application program computes said value n according to a formula:

$$n=2^{ceil(log_2(x/M))}$$

in which a ceiling function ceil rounds a formula variable up to a next positive integer, said M being chosen as an integer power of 2 so that x/M may be obtained by a simple arithmetical right-shifting x by $log_2 M$, which is a predetermined constant.

32. The method of claim 29 wherein said application program computes said value m according to a formula:

$$m = \text{floor}(x/n)$$

in which a floor function floor rounds a formula variable down to a nearest integer, said value n being an integer power of 2, said x/n being obtained by a simple arithmetical right-shifting of said x by a value $\text{ceil}(\log_2(x/M))$ which was previously computed.

33. The method of claim 29 wherein said application program performs a table lookup procedure from said partial lookup table to obtain available common equation terms for calculating said direct estimate of power function value and said indirect estimate of power function value.

34. The method of claim 33 wherein said available common equation terms include a table value T(n), a table value T(m), and a table value T(m+1), said available common equation terms being $n^{1/3}=T(n)$, $m^{1/3}=T(m)$, $(m+1)^{1/3}=T(m+1)$.

35. The method of claim 29 wherein said application program calculates common composite terms for calculating said direct estimate of power function value and said indirect estimate of power function value.

36. The method of claim 35 wherein said common composite terms include $(x-mn)(m+1)^{1/3}$ and $((m+1)n-x)m^{1/3}$, said application program saving said common composite terms in a local memory device for subsequent uses by said application program.

37. The method of claim 29 wherein said application program computes said direct estimate of power function value according to a formula:

$$f_d(x) = n^{1/3}[(m+1)(x-mn)(m+1)^{1/3} + m((m+1)n-x)m^{1/3}].$$

38. The method of claim 37 wherein said application program computes said indirect estimate of power function value according to a formula:

$$\hat{f}_i(x) = x\frac{n^{1/3}}{n}[(x-mn)(m+1)^{1/3} + ((m+1)n-x)m^{1/3}].$$

39. The method of claim 38 wherein said application program calculates said final estimated power function value f(x) according to a formula:

$$f(x) = w_1 f_d(x) + w_2 f_i(x)$$

in which said $f_d(x)$ said direct estimate of power function value, said $f_i(x)$ is said indirect estimate of power function value, said $w_1$ is a selectable direct weighting value, and said $w_2$ is a selectable indirect weighting value.

40. The method of claim 29 wherein said application program computes said value m and said value n by alternately utilizing at least one of a plurality of possible calculation techniques.

41. A method for accurately calculating a mathematical power function for performing one or more signal-processing tasks in an electronic device, comprising:

utilizing an application program to calculate a direct estimate of power function value for said mathematical power function during a direct linear interpolation procedure, said application program also calculating an indirect estimate of power function value for a complement power function during an indirect linear interpolation procedure, said application program then performing a final function-estimate calculation procedure to produce a final estimated power function value from said direct estimate of power function value and said indirect estimate of power function value; and controlling said application program with a processor device to thereby accurately calculate said mathematical power function, said mathematical power function being implemented to perform signal processing applications in at least one of an MPEG Advanced Audio Coding environment and an MPEG I/II, layer 3 environment, said mathematical power function being $f(x) = x^{4/3}$, and said complement power function being $f_c(x) = x^{1/3}$.

42. The method of claim 21 wherein said complement power function is alternately related to said mathematical power function through at least one of a plurality of function relationships.

43. A computer-readable medium comprising program instructions for accurately calculating a mathematical power function by:

utilizing an application program to calculate a direct estimate of power function value for said mathematical power function during a direct linear interpolation procedure, said application program also calculating an indirect estimate of power function value for a complement power function during an indirect linear interpolation procedure, said application program then performing a final function-estimate calculation procedure to produce a final estimated power function value from said direct estimate of power function value and said indirect estimate of power function value; and controlling said application program with a processor device to thereby accurately calculate said mathematical power function, said mathematical power function being utilized to perform signal processing applications in at least one of an MPEG Advanced Audio Coding environment and an MPEG I/II, layer 3 environment.

44. A system for accurately calculating a mathematical power function for performing one or more signal-processing tasks in an electronic device, comprising:

means for calculating a direct estimate of power function value for said mathematical power function during a direct linear interpolation procedure, said means for calculating also computing an indirect estimate of power function value for a complement power function during an indirect linear interpolation procedure, said means for calculating then performing a final function-estimate calculation procedure to produce a final estimated power function value from said direct estimate of power function value and said indirect estimate of power function value; and means for controlling said means for calculating to thereby accurately compute said mathematical power function, said mathematical power function being utilized to perform signal processing applications in at least one of an MPEG Advanced Audio Coding environment and an MPEG I/II, layer 3 environment.

* * * * *